June 6, 1944.    G. R. BENNETT    2,350,321
WEIGHING SCALE
Filed Oct. 23, 1941
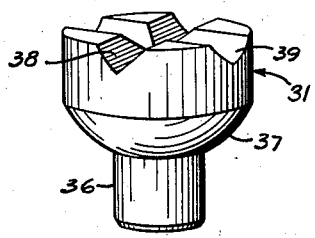
Fig. IV
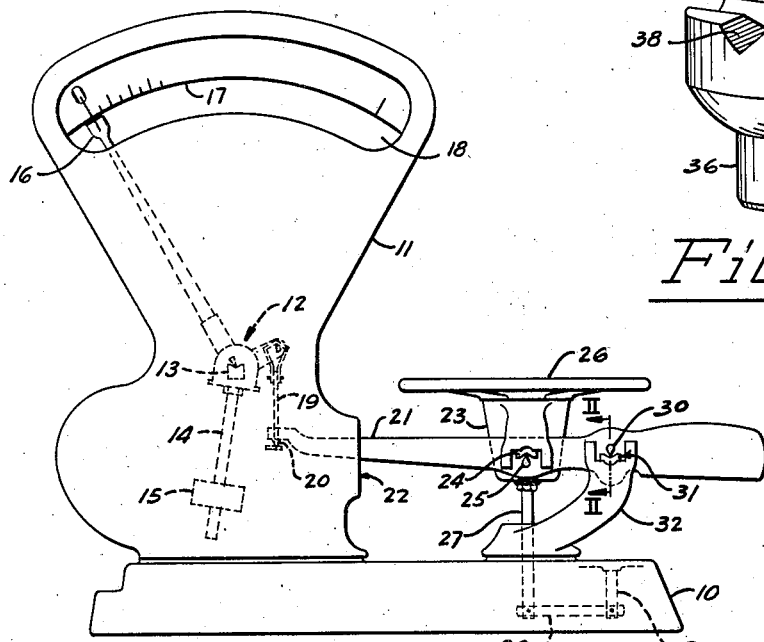
Fig. I
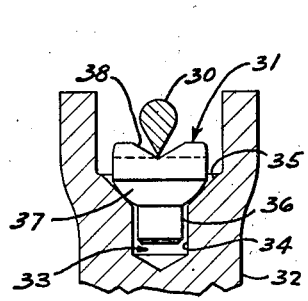
Fig. III
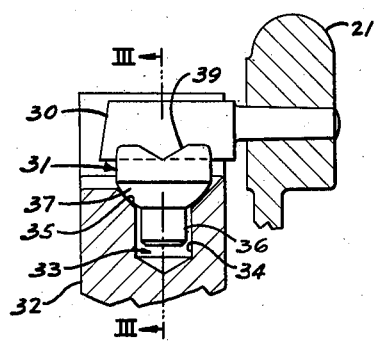
Fig. II
Geoffery R. Bennett
INVENTOR
BY Marshall & Marshall
ATTORNEYS Patented June 6, 1944

2,350,321

UNITED STATES PATENT OFFICE 2,350,321

WEIGHING SCALE

Geoffrey R. Bennett, Toledo, Ohio, assignor to Toledo Scale Company, Toledo, Ohio, a corporation of New Jersey Application October 23, 1941, Serial No. 416,227

5 Claims. (Cl. 308—2)

This invention relates to weighing scales, and more particularly to bearings for use with knife edge pivots for rockably supporting members having oscillating movement.

The use of knife edge pivots and V groove bearings in the weighing scale art is well known, and this type of pivot and bearing have been found to be most satisfactory for affording friction-free pivotal mountings. In time, however, even the slight amount of friction existing between the knife edge of the pivot and the bottom of the V groove, coupled with shocks and jolts given to the scale, may dull the edge of the pivot and spoil the groove in the bearing. This is particularly true of pivots and bearings which support load receivers on which packages may be dropped or which may be jolted or shocked in other ways. Occasionally during the life of the scale therefore, it is necessary to replace both the pivots and the bearings so that the accuracy of the scale will not be destroyed because of the greatly increased friction resulting from the mutilated knife edges and V grooves.

The manufacture of knife edge pivots and V groove bearings is a rather expensive operation because the steel, or other material, from which both the pivots and bearings are fabricated must be very hard, which makes it expensive both as to material and machining.

It is an object of this invention to provide a V bearing block which need not be replaced with a new bearing block each time the knife edge pivot associated with the bearing is replaced.

It is another object of this invention to provide a V groove bearing which need not be replaced when the V groove therein, in which the pivot to be replaced has been riding, is damaged or marred.

It is a further object of this invention to provide a V groove bearing having a plurality of such grooves, each of which can be positioned on the pivot line of the knife edge pivot to be used with the bearing.

More specific objects and advantages are apparent from the description, in which reference is had to the accompanying drawing illustrating a preferred form of scale embodying the invention.

In the drawing:

Fig. I is a view in elevation of a weighing scale employing bearings embodying the invention.

Fig. II is a vertical sectional fragmentary view on a greatly enlarged scale, taken substantially on the line II—II of Fig. I.

Fig. III is a similar view, taken on the line III—III of Fig. II.

Fig. IV is a view in perspective on a still further enlarged scale of a bearing embodying the invention.

This specific drawing and the specific description that follows merely disclose and illustrate the invention and are not intended to impose limitations upon the claims.

Mounted on a base 10 is a fan-shaped housing 11 in the interior of which there is pivotally supported a load counterbalancing pendulum 12. The pendulum 12 comprises a pendulum body 13, a stem 14 and a weight 15, adjustably mounted on the stem 14. An indicator 16 is attached to the pendulum body 13 and cooperates with a chart 17 located in the upper portion of the housing 11 to indicate the weight of loads on the scale. The chart 17 can be viewed through an opening 18 in the housing 11.

A vertically extending link 19 is pivotally attached to the pendulum 12 and supports a cone-shaped nose pivot 20 of a main lever 21 in its lower end. The main lever 21 extends into the housing 11, through an opening 22 in the side wall thereof.

A load receiver spider 23 is mounted, by means of bearings 24, on a load pivot 25 of the lever 21. The spider 23 supports a load receiver 26 and has secured to its under surface a rod 27 which extends downwardly into the base 10 where it is pivotally connected to a link 28, the other end of which is pivotally attached to a stud 29 securely fastened to the base 10. The rod 27, link 28 and stud 29 form a "check link" to maintain the platform spider 23 in vertical position and to insure vertical movement of the load receiver 26. The main lever 21 is mounted, by means of knife edge fulcrum pivots 30 which extend horizontally and transversely from the lever 21 (see also Figures II and III) and rest in fulcrum bearing members 31 which are located in sockets 33 in the upper ends of the two arms of a bifurcated fulcrum bracket 32 which is mounted on the base 10.

Each of the sockets 33 has a vertically extending cylindrical portion 34 and a cone-shaped shoulder 35. Each of the bearing members 31 has a lower cylindrical stud-like portion 36 which extends downwardly into the cylindrical portion 34 of the sockets 33, and a hemispherically-shaped shoulder portion 37 which rests on the cone-shaped shoulder 35 of the socket 33. Milled into the upper surfaces of the bearing member 31 are two V grooves 38 and 39 which extend at right angles to each other and are of the same depth, their side walls meeting at the same angle. The grooves 38 and 39 cross at a point located on the vertical axis of the bearing member. The knife edge pivot 30 rests in one of the grooves 38 or 39 in the bearing member 31 to pivotally support the main lever 21. This method of supporting the bearing member permits it to be "self-centering" as it can rock and swivel on the cone-shaped shoulder 35 of the socket 33 to assure a perfect registry of the pivot associated therewith and the groove 38 or 39 in the bearing.

When that one of the grooves 38 or 39 which is in use becomes marred or damaged, the pivot 30 can be lifted and the bearing 31 then can be swiveled 90 degrees to line up the other groove with the pivot 30. The life of the bearing is thus doubled and maintenance costs of a weighing scale so equipped are appreciably reduced.

The embodiment of the invention that has been disclosed may be modified to meet various requirements.

Having described the invention, I claim:

1. In a weighing scale, in combination, a bearing, a knife edge pivot associated therewith, and a support for said bearing, said bearing having a plurality of V grooves in which said pivot is alternatively positionable, said bearing being rotatable in said support about an axis perpendicular to said V grooves to selectively locate each of said grooves for association with said pivot.

2. In a weighing scale, in combination, a V groove bearing having a pair of such grooves, a knife edge pivot alternatively positionable in either of said grooves, and a support for said bearing, said bearing being rotatably positionable about an axis perpendicular to said grooves in said support to selectively align each of said grooves with the knife edge pivot when mounted therein.

3. In a weighing scale, in combination, a V groove bearing having a pair of intersecting grooves, a knife edge pivot alternatively positionable in either of said grooves, and a support for said bearing, said bearing being horizontally rotatable to permit each of such grooves to be positioned for association with said pivot.

4. A V groove bearing for use with a knife edge pivot, said bearing having a plurality of V grooves and means for adjustably mounting said bearing to allow rotation of said bearing about an axis perpendicular to the V grooves to make alternatively positionable each of said grooves for association with said pivot.

5. A V groove bearing having two grooves cut in its upper surface at 90 degrees from each other, said grooves crossing at the center line of said bearing, said bearing being horizontally rotatable on such center line to alternatively position either of said grooves for mounting a knife edge pivot in said groove.

GEOFFREY R. BENNETT.